Feb. 24, 1931. C. HARTER Re. 17,977

CARLINE REENFORCEMENT AND LOAD LIFTING ARRANGEMENT

Original Filed Feb. 7, 1925 2 Sheets-Sheet 1

Inventor:
Charles Harter.
Vinton E. Sisson.
Attorney.

Feb. 24, 1931. C. HARTER Re. 17,977

CARLINE REENFORCEMENT AND LOAD LIFTING ARRANGEMENT

Original Filed Feb. 7, 1925 2 Sheets-Sheet 2

Inventor
Charles Harter
Clinton E. Brown
Attorney

Reissued Feb. 24, 1931 Re. 17,977

UNITED STATES PATENT OFFICE

CHARLES HARTER, OF ST. LOUIS, MISSOURI, ASSIGNOR TO P. H. MURPHY COMPANY, OF NEW KENSINGTON, PENNSYLVANIA, A CORPORATION OF PENNSYLVANIA

CARLINE REENFORCEMENT AND LOAD-LIFTING ARRANGEMENT

Original No. 1,678,510, dated July 24, 1928, Serial No. 7,560, filed February 7, 1925. Application for reissue filed July 9, 1930. Serial No. 466,898.

The roof structure of some railway cars comprises a series of spaced carlines spanning the distance between the opposite side plates and supporting the roof proper, which roof consists of steel plates, a wooden structure or a composition of both wood and steel. It is common practice to throw a rope or chain over one of these carlines to raise the lading to assist in moving it into or out of the car, and the load imposed thereby distorts the carline causing a disarrangement of the roof parts which results in a leaky roof. Hundreds of thousands of such cars are in service to which my invention is applicable. Even for new cars, however, it is economically advantageous to use my device so that all of the carlines in a car, or in fact, a series of cars will be interchangeable.

The invention resides in providing means to reenforce the roof structure, which means also provides a place for attachment of a load lifting device by being positioned in spaced relation to the adjacent parts of the car so that a rope or chain of a load lifting device may be thrown over it and/or providing a place for attachment of an ice tong or similar mechanism of a load lifting device so that said means may also be used to assist in loading or unloading the car.

The invention reenforces the individual carlines to sustain vertical loads; obtains cooperation between the adjacent carlines to sustain horizontal loads; reenforces the roof framing against distortion in a horizontal plane. The means connecting the adjacent carlines are also beams and provide a place to attach a block and tackle or rope to raise the lading. These connecting means or load lifting beams extend longitudinally of the car so as to provide a large range of operation which is particularly advantageous if the lading is long, such as automobiles or rails; furthermore, the weight of the sustained lading is distributed to at least two reenforced carlines.

The connecting member or beam for attachment of load lifting device extends longitudinally of the car and is preferably located adjacent the center of the car or may be positioned near the side plate or one near each side plate, or if desired, may be located in both or in all such positions and still come within the scope of this invention. It may be desirable to raise the load simultaneously from more than one point. The beams may extend the full length of the car and reenforce each and every carline or they may simply include a plurality of carlines and be located as desired. The preferred spacing is shown in Fig. 1. The carlines are preferably apexed or arched to provide a sloping roof to shed water, etc., and the beams are so positioned that their bottom portion is not lower than the ends of the carlines so as not to interfere with the vertical free inside height of the car which is measured from a horizontal plane at the juncture of the lower portion of the carlines with the side plates.

The end plate is the end carline of a railway car for all intents and purposes of this invention, therefore, no distinction is made in the claims herein. If it is inconvenient to support the beam 7 under the end carline 2 (or end plate) it may be supported by a strap 14, as shown in Fig. 6, or any other convenient means.

Another object is to obtain a plurality of trussed carlines having a common strut. This common strut also prevents the carlines from tilting or buckling.

Figure 1:
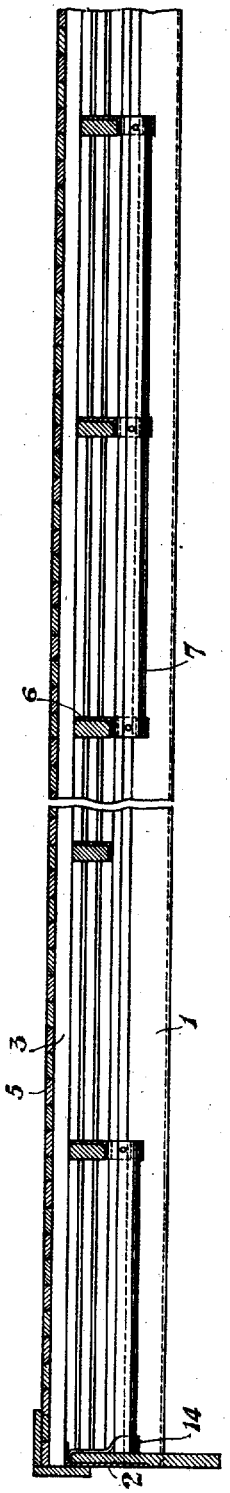
Fig. 1 is a longitudinal section along the center of a car with composite roof showing my device applied thereon.
Figure 2:
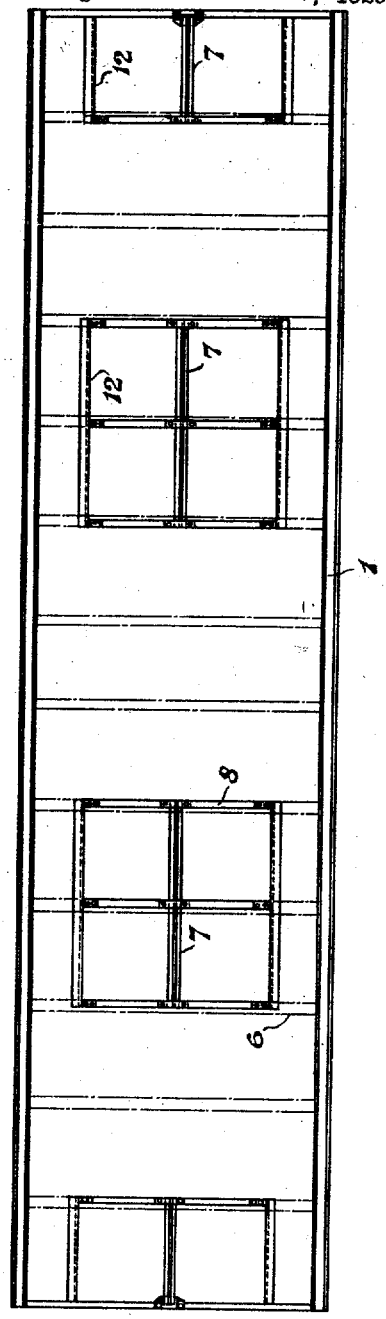
Fig. 2 is a skeleton plan view of a railway car showing the preferred location of my device on the car.

The usual parts of the car are shown wherein 1 is the side plate; 2 the end plate; 3 the ridge pole; 4 the purlins; 5 the roof proper and 6 the carlines. Old cars have wooden carlines, but the modern car is equipped with a metallic carline (sometimes having a wooden filler).

In my arrangement I provide a beam 7 which extends longitudinally of the car below the carlines 6 and spaced away from the roof 5. This beam 7 then serves as a place for the attachment of a block and tackle or rope so as to provide means for attachment of load lifting device to assist in moving the lading. This beam passes under a plurality of carlines. Below each carline and parallel thereto is a brace or strengthening member 8 which has its middle portion secured to the beam (by rivets 9) and its extremities attached to the carline (by rivets 10). The beam is also secured to the carline by attachments 11. By this arrangement the carline is trussed because the brace 8 becomes a tension member and the beam 7 a strut, thereby reinforcing the carline 6 to sustain vertical loads. However, any other brace or member may be used to hold the beam 7 in alignment and position. Conversely the beam 7 holds the brace or members 8 in their proper position. The beam 7 forms a common strut for the adjacent carlines and secures cooperation between these carlines and prevents them from tipping or buckling as beams have a tendency to do under load. The cooperation of the carlines and the beam (or beams) reinforces the roof framing against distortion in a horizontal plane.

Figure 3:
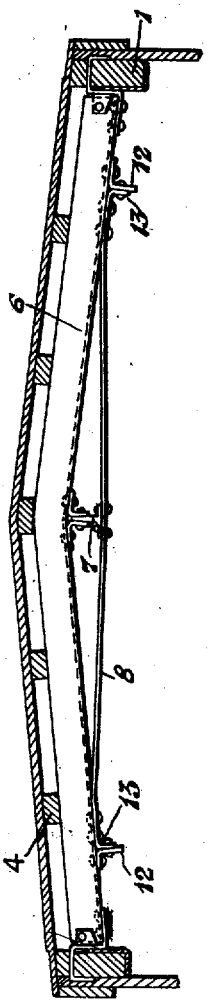
Fig. 3 is a cross section of a car with composite roof showing my device applied thereon.
Figure 4:
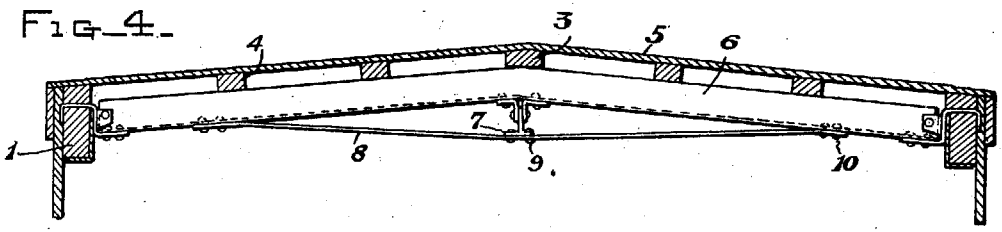
Fig. 4 is a cross section of a car with a composite roof showing a modification of my device applied thereon.
Figure 7:
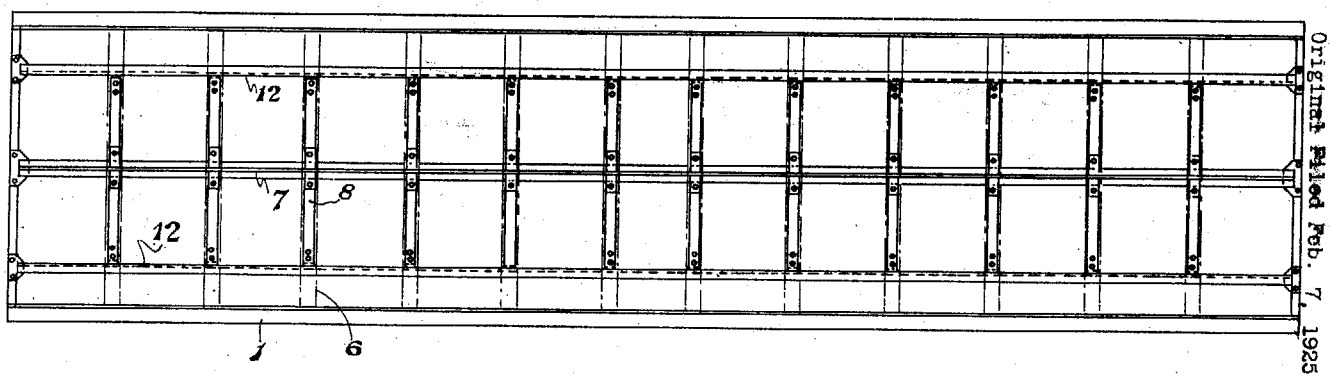
Fig. 7 shows a skeleton plan view of a railway car with the beam extending the full length of the car.
Figure 6:
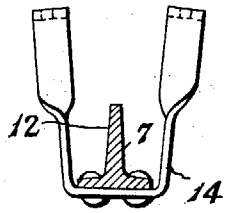
Fig. 6 shows a means of supporting the device adjacent the end carline (or end plate).
Figure 5:
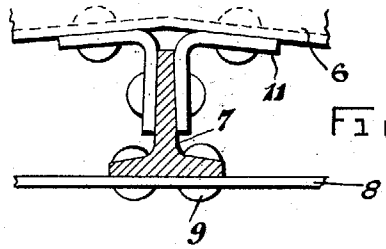
Fig. 5 is an enlarged detail of part of the device showing its relation to the middle of the carline.

Fig. 3 shows an arrangement having beams extending adjacent the center of the car and also other beams 12 extending longitudinally of the car and positioned adjacent the side plates 1. It will be noted that the braces 8 perform the further function of bracing (13) the beam 12 and furnishing additional means to secure it to the carline 6.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway car, the combination of a roof, a plurality of carlines, each comprising a tension and a compression portion, and a member spaced below said roof extending normal to said carlines and secured to each of said tension portions.

2. In a railway car, the combination of a roof, a plurality of carlines, each comprising a tension and a compression portion, and a member spaced below said roof extending normal to said carlines and secured to each of said tension and compression portions.

3. In a railway car, the combination of a roof, a plurality of carlines, each comprising a tension and a compression portion, and a beam spaced below said roof extending normal to said carlines, said beam positioned between said portions and secured to each of said tension portions.

4. In a railway car, the combination of a roof, a plurality of carlines, each comprising a tension and a compression portion, and a beam spaced below said roof extending normal to said carlines, said beam positioned between said portions, and secured to each of said tension and compression portions.

5. In a railway car, the combination of a roof, and a plurality of trussed carlines having a common strut member separated from said roof.

6. In a railway car, the combination of a roof, carlines, a beam secured to some of said carlines extending substantially longitudinally of the car, spaced below said roof, and braces extending normal to said beam secured to said beam and said carlines respectively.

7. In combination with a railway car having a roof and carlines; means to assist in moving a lading comprising a member secured to some of said carlines extending longitudinally of the car positioned below said carlines and separated from said roof, and a brace below each carline secured to said member and said carline so as to truss said carline.

8. In a railway car having a roof and carlines; the combination of means to assist in moving a lading comprising a member secured to some of said carlines extending longitudinally of the car adjacent the center thereof spaced below said roof, other members secured to some of said carlines extending longitudinally of the car adjacent the sides thereof spaced below said roof, and a brace below each carline secured to each of said members and the carline so as to brace each of said members.

9. A railway car provided with a roof frame including a ridge pole, and a plurality of trussed carlines, each of said carlines including a compression member below said ridge pole, a tension member arranged below said compression member and a strut comprising a connecting beam uniting said carlines, said connecting beam being arranged longitudinally of the car and separated from the ridge pole to provide a space for the reception of a hoisting device.

10. A railway car having a roof frame including a plurality of trussed carlines, each comprising a compression member secured to the roof, a tension member located below and having its ends secured to said compression member, and a connecting strut spanning the space between said trussed carlines, said strut being located entirely below the compression member of each carline so as to provide an open space above the strut, fastening means whereby said connecting strut is rigidly secured to the compression member of each of said carlines, and fastening means whereby said connecting strut is rigidly secured to the tension member of each of said carlines.

11. In a railway car having a roof and carlines; members strengthening certain of said carlines against vertical deflection, and additional members connecting said carlines and reenforcing them against lateral deflection, said additional member spaced below the roof so as to constitute means to assist in moving the lading.

12. In a railway car having side plates, the combination of a plurality of spaced carlines with their opposite ends attached to the opposite side plates, a load lifting beam extending longitudinally of the car and secured to the underside of the carlines, the bottom of said beam being not lower than the ends of the carlines, and a ridge beam resting upon said carlines so as to provide a space between the ridge beam and the lifting beam between the carlines.

13. In a railway car having side plates and end plates, the combination of a plurality of apexed carlines with their opposite ends attached to the opposite side plates, a load lifting beam extending longitudinally of the car and secured to the underside of the carlines and to both of the end plates, the bottom of said beam being not lower than the ends of the carlines, and a ridge beam resting upon said carlines so as to provide a space between the ridge beam and the lifting beam between the carlines.

14. In a railway car, the combination of a plurality of carlines, a longitudinally extending ridge pole above the carlines, and a longitudinally extending load lifting beam secured to said carlines so as to provide a space between the beam and the ridge pole.

15. In a railway car, the combination of a plurality of carlines, a longitudinally extending ridge pole above the carlines, roofing in a plane above said ridge pole, and a longitudinally extending load lifting beam secured to said carlines so as to provide a space between the beam and the ridge pole and between the beam and the roofing.

16. In a railway car, the combination of a plurality of apexed carlines, a longitudinally extending ridge pole above the carlines, and a longitudinally extending load lifting beam secured to said carlines so as to provide a space between the beam and the ridge pole, the bottom of said beam being not lower than the ends of the carlines.

17. In a railway car, the combination of a plurality of carlines, and a load lifting beam positioned below in spaced relation to said carlines and extending normally thereto, said beam having a substantially vertical stem secured to said carlines and laterally extending flanges for attachment of an ice tong of a load lifting device.

18. In a railway car, the combination of a plurality of carlines, a load lifting beam positioned below in spaced relation to said carlines and extending normally thereto, said beam having a substantially vertical stem secured to said carlines and laterally extending flanges for attachment of an ice tong of a load lifting device, and means securing said flanges to said carlines.

CHARLES HARTER.